(12) United States Patent
Beichter et al.

(10) Patent No.: US 9,041,335 B2
(45) Date of Patent: May 26, 2015

(54) DRIVER CIRCUIT AND DRIVING METHOD

(71) Applicants: Martin Beichter, Stuttgart (DE); Mark Heilig, Winnenden (DE); Ulf Rinckleb, Unterschneidheim (DE); Heinrich Steinhart, Aalen (DE)

(72) Inventors: Martin Beichter, Stuttgart (DE); Mark Heilig, Winnenden (DE); Ulf Rinckleb, Unterschneidheim (DE); Heinrich Steinhart, Aalen (DE)

(73) Assignee: C. & E. FEIN GMBH (DE)

( * ) Notice: Subject to any disclaimer, the term of this patent is extended or adjusted under 35 U.S.C. 154(b) by 143 days.

(21) Appl. No.: 13/847,810

(22) Filed: Mar. 20, 2013

(65) Prior Publication Data

US 2013/0249462 A1    Sep. 26, 2013

(30) Foreign Application Priority Data

Mar. 20, 2012  (EP) .................................. 12160277

(51) Int. Cl.
| | |
|---|---|
| *H02P 1/00* | (2006.01) |
| *H02P 3/00* | (2006.01) |
| *H02M 7/217* | (2006.01) |
| *H02M 1/42* | (2007.01) |
| *H02P 7/29* | (2006.01) |

(52) U.S. Cl.
CPC ............ *H02M 7/2176* (2013.01); *Y02B 70/126* (2013.01); *H02M 1/4225* (2013.01); *H02M 2001/4291* (2013.01); *H02P 7/29* (2013.01)

(58) Field of Classification Search
USPC .................. 318/139, 432, 504, 803, 772, 807; 363/37, 53, 74
See application file for complete search history.

(56) References Cited

U.S. PATENT DOCUMENTS

| | | | | | |
|---|---|---|---|---|---|
| 5,111,374 | A | * | 5/1992 | Lai et al. .......................... | 363/37 |
| 5,235,504 | A | * | 8/1993 | Sood ................................ | 363/53 |
| 5,633,793 | A | * | 5/1997 | Lee et al. ........................ | 363/127 |
| 5,710,699 | A | * | 1/1998 | King et al. ...................... | 363/132 |
| 5,786,992 | A | * | 7/1998 | Vinciarelli et al. ............. | 363/89 |
| 5,793,623 | A | * | 8/1998 | Kawashima et al. ....... | 363/56.05 |
| 5,838,144 | A | * | 11/1998 | Wills et al. ..................... | 323/238 |
| 5,952,812 | A | * | 9/1999 | Maeda ........................... | 318/803 |
| 6,111,770 | A | * | 8/2000 | Peng .............................. | 363/131 |
| 6,137,700 | A | * | 10/2000 | Iida et al. ......................... | 363/89 |

(Continued)

FOREIGN PATENT DOCUMENTS

| | | |
|---|---|---|
| EP | 0504094 A2 | 9/1992 |
| JP | 3230759 A | 10/1991 |

OTHER PUBLICATIONS

Junyang Luo, et al.; "A New Continuous Conduction Mode PFC IC With Average Current Mode Control"; © 2003 IEEE; pp. 110-114.

*Primary Examiner* — Paul Ip
(74) *Attorney, Agent, or Firm* — St. Onge Steward Johnston & Reens LLC

(57) ABSTRACT

A driver circuit for driving an electrical load includes an input terminal pole connecting the driver circuit to an AC voltage source, an output terminal pole connecting the driver circuit to the load, a rectifier circuit connected to the input terminal pole for converting an AC voltage into a pulsating DC voltage, and a control element connected to the rectifier circuit and to the output terminal pole. The control element has a switch and a controller, the controller switching the switch on and off by means of a pulse train signal, wherein an electrical output value of the driver circuit is adjustable by switching the switch. The controller is configured to vary at least one time-based value of the pulse train signal within one period of the pulsating DC voltage such that a driver current is adjusted at the output terminal pole having a defined waveform within the period.

18 Claims, 7 Drawing Sheets

(56) References Cited

U.S. PATENT DOCUMENTS

| | | | |
|---|---|---|---|
| 6,194,856 B1* | 2/2001 | Kobayashi et al. | 318/432 |
| 6,244,061 B1* | 6/2001 | Takagi et al. | 62/229 |
| 6,367,273 B2* | 4/2002 | Takagi et al. | 62/230 |
| 6,906,503 B2* | 6/2005 | Lopez-Santillana et al. | 323/283 |
| 7,088,081 B2* | 8/2006 | Takahashi et al. | 323/222 |
| 7,113,380 B2* | 9/2006 | Youm | 361/91.1 |
| 7,148,664 B2* | 12/2006 | Takahashi et al. | 323/222 |
| 7,221,121 B2* | 5/2007 | Skaug et al. | 318/807 |
| 7,420,351 B2* | 9/2008 | Grbovic | 318/772 |
| 7,612,542 B2* | 11/2009 | Eguchi et al. | 323/222 |
| 8,716,961 B2* | 5/2014 | Ramu | 318/139 |
| 8,817,499 B2* | 8/2014 | Videt et al. | 363/37 |
| 2004/0047166 A1* | 3/2004 | Lopez-Santillana et al. | 363/89 |
| 2004/0136133 A1* | 7/2004 | Youm | 361/91.1 |
| 2005/0068001 A1* | 3/2005 | Skaug et al. | 318/807 |
| 2005/0285583 A1* | 12/2005 | Takahashi et al. | 323/282 |
| 2006/0119337 A1* | 6/2006 | Takahashi et al. | 323/282 |
| 2007/0114962 A1* | 5/2007 | Grbovic | 318/772 |
| 2014/0133202 A1* | 5/2014 | Tamaoka | 363/74 |

* cited by examiner

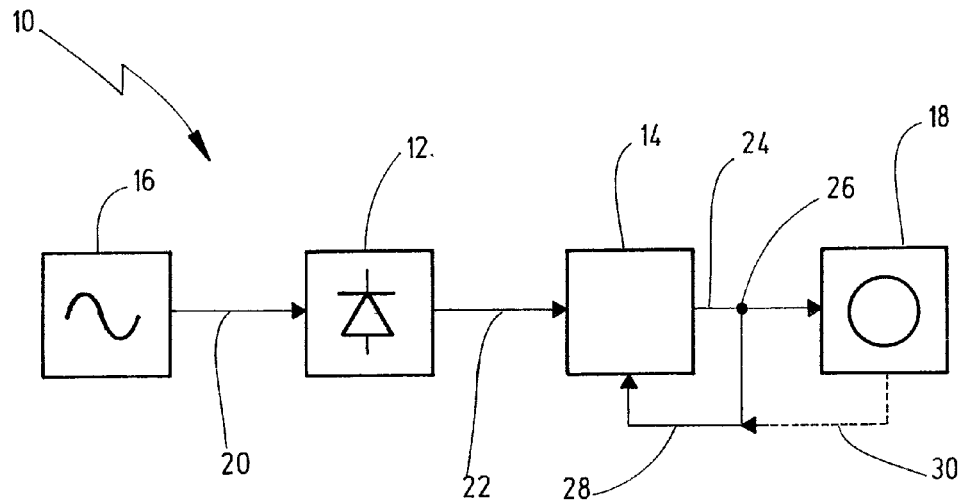
Fig.1
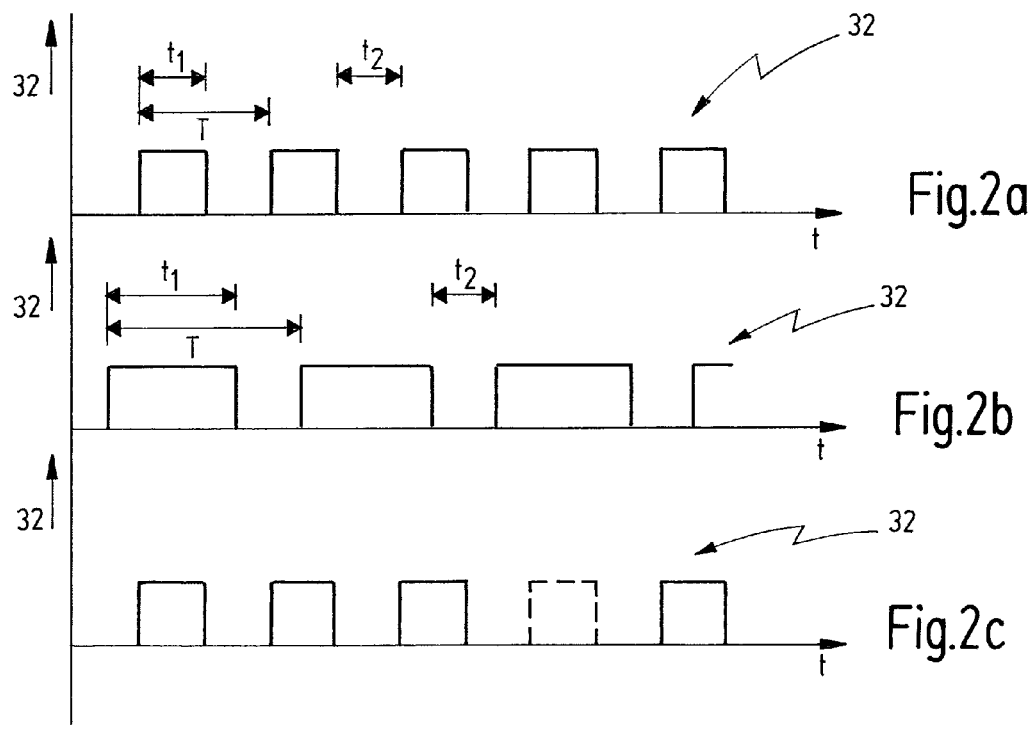
Fig.2a
Fig.2b
Fig.2c

DRIVER CIRCUIT AND DRIVING METHOD

FIELD OF THE INVENTION

The present invention relates to a driver circuit for driving an electrical load, in particular an electrical machine, comprising an input terminal pole pair adapted to connect the driver circuit to an AC voltage source, an output terminal pole pair adapted to connect the driver circuit to the load, a rectifier circuit which is connected to an input terminal pole pair and which is adapted to convert an AC voltage from the AC voltage source into a pulsating DC voltage, a control element which is connected to the rectifier circuit on the input side and to the output terminal pole pair on the output side, wherein the control element has a controllable switch and a controller for controlling the controllable switch, wherein the controller accordingly switches the controllable switch on and off by means of a pulse train signal, and wherein an electrical output value of the driver circuit can be adjusted by switching the controllable switch.

The present invention furthermore relates to a method for driving an electrical load, in particular an electrical machine, having the steps of connecting a rectifier circuit to an AC voltage source, converting an AC voltage from the external AC voltage source into a pulsating DC voltage, converting the pulsating DC voltage by means of a control element into an electrical output value for driving the electrical load, wherein the control element has a controllable switch which is switched on and off accordingly by means of a pulse train signal in order to adjust the electrical output value depending on at least one time-based value of the pulse train signal.

Furthermore, the present invention relates to a power tool having an electrical machine and having a driver circuit for driving the electrical machine.

Finally, the present invention relates to an electrical drive unit having an electrical machine which has a stator and a rotor, and having a driver circuit for driving the electrical machine.

BACKGROUND OF THE INVENTION

The prior art discloses driving an electrical direct-current load, such as a direct-current machine or an inverter for driving an alternating-current machine by means of a driver circuit which has a rectifier and a voltage transformer for converting an AC mains voltage into any DC voltage. Step-up converters, step-down converters or step-up/step-down converters are typically used as DC-DC converters. The rectifier converts the AC mains voltage into a pulsating DC voltage, a capacitor having a high capacitance typically being connected between the voltage transformer and the rectifier for smoothing the pulsating AC voltage. The DC-DC converter is typically connected on the output side to a smoothing capacitor having a high capacitance in order to provide a constant or nearly constant output voltage.

Depending on the connected electrical load or depending on a rotational speed and a load torque of a connected electrical machine, a corresponding load current arises at the output, and electrical power is accordingly withdrawn by the electrical load of the driver circuit.

It is disadvantageous that electrical energy is exchanged with the intermediate-circuit capacitor, thus reducing the efficiency of the drive circuit. Furthermore, it is disadvantageous that the intermediate-circuit capacitors which are used require a large amount of space and have a high weight.

SUMMARY OF THE INVENTION

It is therefore an object of the present invention to provide an improved drive circuit for an electrical load which is more efficient, requires less space and has lower weight.

This object is achieved with the driver circuit initially specified for driving an electrical load, in that the controller is adapted to vary at least one time-based value of the pulse train signal within one period of the pulsating DC voltage such that a driver current is adjusted at the output terminal pole having a defined waveform within the period.

This object is achieved with the method initially specified, in that the time-based value of the pulse train signal is varied within one period of the pulsating DC voltage in order to adjust a driver current as the electrical output value in the period in a correspondingly defined manner.

Furthermore, this object is achieved by a power tool having an electrical machine and having a driver circuit for driving the electrical machine of the kind specified above.

Finally, this object is achieved by an electrical drive unit having an electrical machine and having a driver circuit for driving the electrical machine of the kind specified above.

According to the invention, a time-based value of the pulse train signal means any time-based shift of the rising and falling pulse slopes and any variation of the frequency of the pulses.

By being able to impress the driver current with a defined waveform via the pulse train signal, it is possible to dispense with a smoothing capacitor on the output side, so that no electrical power is exchanged with the intermediate-circuit capacitor. All electrical power is thus delivered to the electrical load, making it possible to increase the efficiency of the driver circuit accordingly. Since it is possible to dispense with the intermediate-circuit capacitor by using this kind of drive, the size and weight of the driver circuit can also be reduced.

It is preferable if the time-based value of the pulse train signal is a pulse frequency within the period.

In this way, it is possible to control the controllable switch in a variable manner and to adjust the defined waveform of the driver current at low control technology expense.

It is also preferable if the time-based value of the pulse train signal is a duty cycle of the pulse train signal.

In this way, it is possible to vary the driver current over a large range of values.

It is also preferable if the controller is connected to a measuring arrangement which is associated with the output terminal pole for measuring an output voltage and/or the driver current, in order to adjust the time-based value based on the measured output voltage and/or the measured driver current.

In this way, feedback of the output values of the driver circuit can be easily achieved, making it possible to adjust the output values in real time and with precision.

It is furthermore preferable if a control unit of the load is connected to the controller via a control line in order to adjust the time-based value.

In this way, it is possible for the electrical load to request a required driving signal or a required electrical input value from the driver circuit, and the device can thus be supplied with electrical power.

It is furthermore preferable if the control element has a measuring apparatus on the input side in order to measure the pulsating DC voltage and to provide the driver current by means of the pulse train signal if the pulsating DC voltage exceeds a predefined threshold value.

In this way, electrical power is thus provided to the electrical load only if the pulsating DC voltage exceeds a particular threshold value, thus reducing the exchange of reactive currents of the electrical load with the driver circuit.

It is furthermore preferable if the time-based value can be adjusted such that electrical power provided at the output terminal pole is constant.

In this way, it is possible for the electrical load to be especially precisely driven, since the power delivered by the electrical load corresponds to the supplied power.

It is furthermore preferable if the time-based value can be adjusted such that the provided driver current is constant.

It is possible to provide a constantly delivered current at particularly low control technology expense.

It is furthermore preferable if the time-based value can be adjusted such that the driver current is in phase with the output voltage.

In this way, it is possible to reduce the exchange of reactive power between the electrical load and the driver circuit, since no phase shifts can occur between the driver current and the output voltage.

It is furthermore preferable if the measuring arrangement is configured to measure the electrical value at predefined time points within the period and to provide a corresponding control signal to the controller.

In this way, it is possible to implement the measuring arrangement at low technical expense and to transfer the control signal to the controller according to requirements.

It is particularly preferable if the controller is configured to control the controllable switch depending on the control signal at the predefined time points by means of the pulse train signal. In other words, at least one of the output values of the driver circuit is measured at the predefined time points and is connected by means of the pulse train signal based on the measured value of the controllable switch.

It is thus possible to ensure that the control stability of the fed-back signal is particularly high.

It is furthermore preferable if the control element is configured as a step-up converter, a step-down converter or a step-up/step-down converter.

In this way, it is possible for the driver circuit to provide the corresponding output value at low technical expense and with high efficiency.

It is furthermore preferable if the control element has a capacitor on the output side having a capacitance which is lower than 100 nF.

In this way, it is possible to filter output voltage harmonics, thus making it possible to reduce vibrations of the electrical load and corresponding thermal losses by the electrical load.

The rotor of the electrical machine of the electrical drive unit preferably has a flywheel mass in order to store rotational energy of the rotor.

In this way, it is possible to compensate for transient dips in the drive torque or the drive power that may occur via the driver circuit, so that the power delivered by the electrical machine or the rotational speed provided by the electrical machine and the torque provided by the electrical machine can be kept constant.

As a result, it is possible to drive the electrical load in a particularly precise manner via the driver circuit, since the driver current can be set precisely, and therefore the power provided to the electrical load is controlled by the driver circuit and not determined by the electrical load. In this way, it is possible to drive the electrical load in a more precise manner. Furthermore, by adjusting the driver current precisely, it is possible to dispense with smoothing of the output voltage, thus simultaneously making it possible to dispense with a corresponding smoothing capacitor. In this way, it is possible to provide the driver circuit at lower financial and technical expense in a compact configuration and with lower weight. By feeding back the output signals, it is possible to adjust the current, voltage and electrical power at the output of the driver circuit precisely.

It is to be understood that the characteristics described above and still to be described below may be used not only in the respectively specified combination, but also in other combinations or in isolation, without departing from the scope of the present invention.

Embodiments of the invention are depicted in the diagrams and are explained in more detail in the following description. The following are shown:

BRIEF DESCRIPTION OF THE DRAWINGS

FIG. 1 A schematic representation of a driver circuit according to the invention for driving an electrical load;

FIG. 2a-c Various waveforms of a pulse train signal for controlling a control element of the driver circuit;

DETAILED DESCRIPTION OF THE INVENTION

Figure 3:
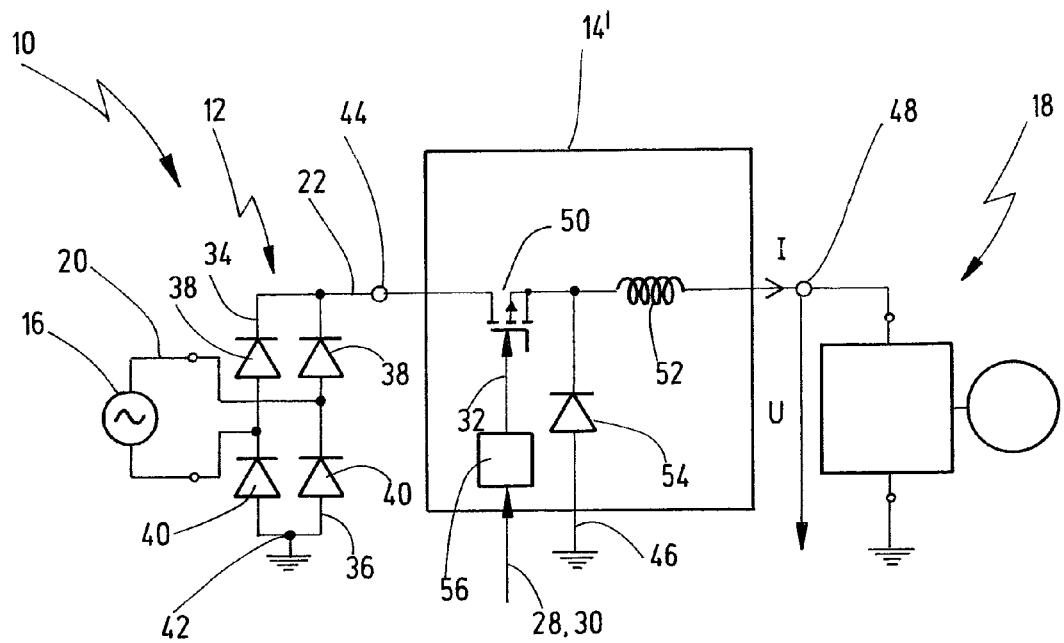
FIG. 3 A driver circuit having a step-down converter as a control element.

In FIG. 1, a driver circuit for driving an electrical load is represented schematically and generally identified by 10.

The driver circuit 10 has a rectifier 12 and a control element 14. The rectifier 12 is connected to an AC voltage source 16 such as a public network 16. The control element 14 is connected to the rectifier 12 on the input side and to an electrical load 18 on the output side. The electrical load 18 may, for example, be configured as an electrical machine 18.

The AC voltage source 16 provides an AC voltage 20. The rectifier 12 is connected to the AC voltage source 16 in order to receive the AC voltage 20 as an input value. The rectifier 12 converts the AC voltage 20 into a pulsating DC voltage 22, which the rectifier 12 provides to the control element 14. The AC voltage 20 of the AC voltage source 16 is preferably a sinusoidal AC voltage 20. The rectifier is, for example, configured as a bridge rectifier 12.

The control element 14 receives the pulsating DC voltage 22 from the rectifier 12 and provides an electrical output value 24 for driving the electrical load 18. The electrical output value 24 is an electrical driver current whose waveform is adjusted or impressed by the control element 14. A measuring device 26 is arranged at the output of the control element 14, which measures an output voltage and the driver current of the control element 14 and controls the control element 14 by means of a control signal 28 in order to adjust the electrical driver current. Alternatively, for the case that the electrical load 18 is configured as a controlled load, the electrical load 18 is able to feed back a control signal 30 to the control element 14, in order to control the control element 14 and correspondingly adjust the electrical output value 24. In this case, the electrical load 18 is able to request required electrical power from the driver circuit 10 by means of the control signal 30.

It is possible to adjust the electrical output value 24 via the control element 14 such that constant electrical power is provided to the electrical load 18 or a constant driver current is provided to the electrical load 18, or the electrical driver current is adjusted such that the driver current and electrical voltage on the output of the control element 14 have a fixed phase relationship and are preferably set in phase. This is possible because the control element 14 is able to adjust or impress the driver current on the output precisely at any time point, so that it is possible to set output values having a corresponding waveform.

For this purpose, the control element 14 preferably has a controllable switch, wherein the driver current is adjusted by alternately opening and closing the controllable switch and by varying the switching frequency and/or the switch-on duration or the duty cycle of the controllable switch. In the simplest embodiment, the control element 14 has only the controllable switch. The control element is preferably configured as a step-up converter, step-down converter or step-up/step-down converter having one or a plurality of controllable switches.

The controllable switch or switches are actuated by means of a pulse train signal via a control unit not separately depicted in FIG. 1, in order to open and close the controllable switch and thus to adjust the corresponding driver current. The controllable switch is actuated or switched if the pulsating DC voltage 22 exceeds a predefined threshold value. Furthermore, the driver current is adjusted to have a defined waveform, namely, by varying the pulse train signal. It is possible to vary the pulse train signal with respect to the switch-on duration or frequency in order to adjust the driver current accordingly.

FIGS. 2a to c show a schematic representation of a pulse train signal for actuating the controllable switch of the control element 14, which is generally identified by 32. In FIG. 2a, the pulse train signal 32 is depicted with a general shape. The pulse train signal 32 has five pulses having a pulse width $t_1$ and a period T. The pulse width $t_1$ and a pulse interval $t_2$ are identical in this example, so that a switch-on duration or a duty cycle of $t_1/T=0.5$ results. By varying the time-based values $t_1$, $t_2$ and T, it is possible to adjust the electrical output values 24 of the control element 14 and particularly the driver current. Alternatively, it is also possible to vary the pulse frequency while the switch-on duration remains constant in order to adjust the electrical output values 24 and particularly the driver current.

FIG. 2b shows an example of an alternative pulse train of the pulse train signal 32. The pulse train has a greater switch-on duration $t_1$ and a greater period T, whereas the pulse interval $t_2$ is identical to the pulse interval $t_2$ from FIG. 2a. A greater duty cycle thus results, causing the driver current to be adjusted to another value. In other words, the pulse train signal 32 in FIG. 2b provides a pulse width-modulated signal, wherein the driver current is adjusted via the pulse width.

FIG. 2c depicts an alternative embodiment of the pulse train signal 32 and accordingly shows an alternative method for actuating the controllable switch. The pulse train 32 has four pulses which are respectively identical to the pulses in FIG. 2a, whereas the fourth pulse, which is illustrated schematically as dashed, is omitted or not formed. In other words, in this embodiment, the controllable switch is switched with a fixed pulse width at predefined time points, one of the pulses being omitted or skipped under certain conditions, and the controllable switch not being switched at this time point. The pulse interval $t_2$ and the duty cycle $t_1/T$ are thus varied for a short time in order to be able to adjust the output value 24 accordingly.

In order to adjust or impress the driver current, a frequency f of the pulse train signal 32 is substantially greater than the frequency f of the pulsating DC voltage 22. The ratio of the frequency of the pulse train signal 32 to the frequency of the pulsating DC voltage 22 is greater than 1,000.

FIG. 3 shows an embodiment of the driver circuit 10 in which the control element 14' is configured as a step-down converter 14'. Identical elements are identified by identical reference numbers, wherein only the special features are explained here.

The rectifier 12 is configured as a bridge rectifier 12 and has two rectifier bridges 34, 36 with two respective diodes 38, 40. The rectifier 12 is connected to the AC voltage source 16, has an earth pole 42, and is electrically connected to an input terminal pole 44 of the control element 14.

The control element 14' is connected to an earth pole 46 or ground 46 and has the input terminal pole 44 and an output terminal pole 48, which is connected to the electrical load 18. The control element 14' has a controllable switch 50, an inductor 52 or a coil 52 and a diode 54. The controllable switch 50 is connected in series to the inductor 52 between the input terminal pole 44 and the output terminal pole 48. The diode 54 is connected between the controllable switch 50 and the inductor 52 and forms a connection from the earth pole 46 to the inductor 52. The controllable switch 50 is actuated or opened and closed by a control unit 56 by means of the pulse train signal 32. By opening and closing the controllable switch 50, the driver current I and an output voltage U are provided at the output terminal pole 48 as the electrical output values 24, which are used to drive the electrical load 18.

By varying the pulse train signal 32, that is, by varying a time-based value of the pulse train signal 32 as described above, it is possible to impress the driver current I with a defined waveform. The control unit 56 is triggered by the control signal 28 or the control signal 30 of the measuring device 26 or of the electrical load 18 in order to adjust or impress the driver current I accordingly via the pulse train signal 32.

Furthermore, a measuring device, which is not illustrated separately here, is associated with the input terminal pole 44, which device measures the pulsating DC voltage 22 and transfers a corresponding signal to the control unit 56. The control unit 56 switches the controllable switch 50 only if the pulsating DC voltage 22 exceeds a predefined threshold value. The driver current I and the output voltage U are thus adjusted only in the event that the pulsating DC voltage 22 exceeds the predefined threshold value. Because the output voltage U can be adjusted to a level higher than voltages potentially induced in the electrical load 18, it is thus possible to avoid the exchange of reactive currents between the electrical load 18 and the control element 14.

In conventional driver circuits, a smoothing capacitor having a high capacitance is connected on the input side, that is, between the input terminal pole 44 and the earth pole 42, in order to smooth the pulsating DC voltage 22. Furthermore, according to the prior art, another smoothing capacitor having a high capacitance is connected on the output side of the control element 14, that is, between the output terminal pole 48 and the earth pole 46, in order to smooth the output voltage U accordingly. This additional capacitor is also described as an intermediate-circuit capacitor. Such embodiments having high capacitances require a large amount of space, have a high weight, and reduce the efficiency of the driver circuit 10, because a large amount of electrical power is exchanged here between the control element 14, the intermediate-circuit capacitor and the electrical load 18. Because of the special way in which the controllable switch 50 is actuated here, no separate smoothing is required, and the driver circuit 10 according to the invention therefore does not require an intermediate-circuit capacitor. Furthermore, smoothing can also be performed by a capacitance of the electrical load 18 on the input side.

Figure 4:
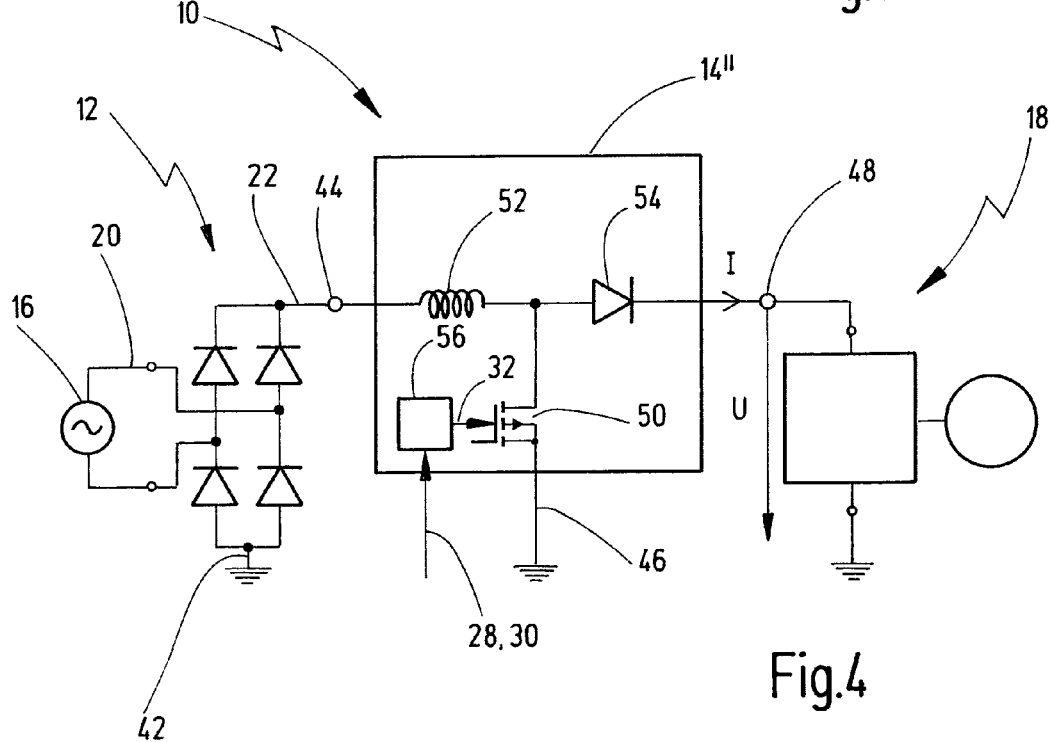
FIG. 4 A driver circuit having a step-up converter as a control element.

FIG. 4 schematically illustrates an alternative embodiment having a step-up converter as a control element 14". Identical elements are identified by identical reference numbers, wherein only the special features are explained here.

The control element 14" is configured as a step-up converter and has the controllable switch 50, the inductor 52 and the diode 54. The inductor 52 is connected in series to the diode 54, namely, between the input terminal pole 44 and the output terminal pole 48. The controllable switch 50 is connected between the inductor 52 and the diode 54 and forms a connection to the earth pole 46. The controllable switch 50 is actuated by the control unit 56 by means of the pulse train signal 32. The control unit 56 is triggered by the measuring device 26 or the electrical load 18 by means of the control signal 28 or of the control signal 30 in order to adjust the driver current I accordingly. By opening and closing the controllable switch 50, the driver current I and the output voltage U are provided via the step-up converter, in which case the output voltage U may be larger than the pulsating DC voltage 22 at the input terminal pole 44.

Figure 5:
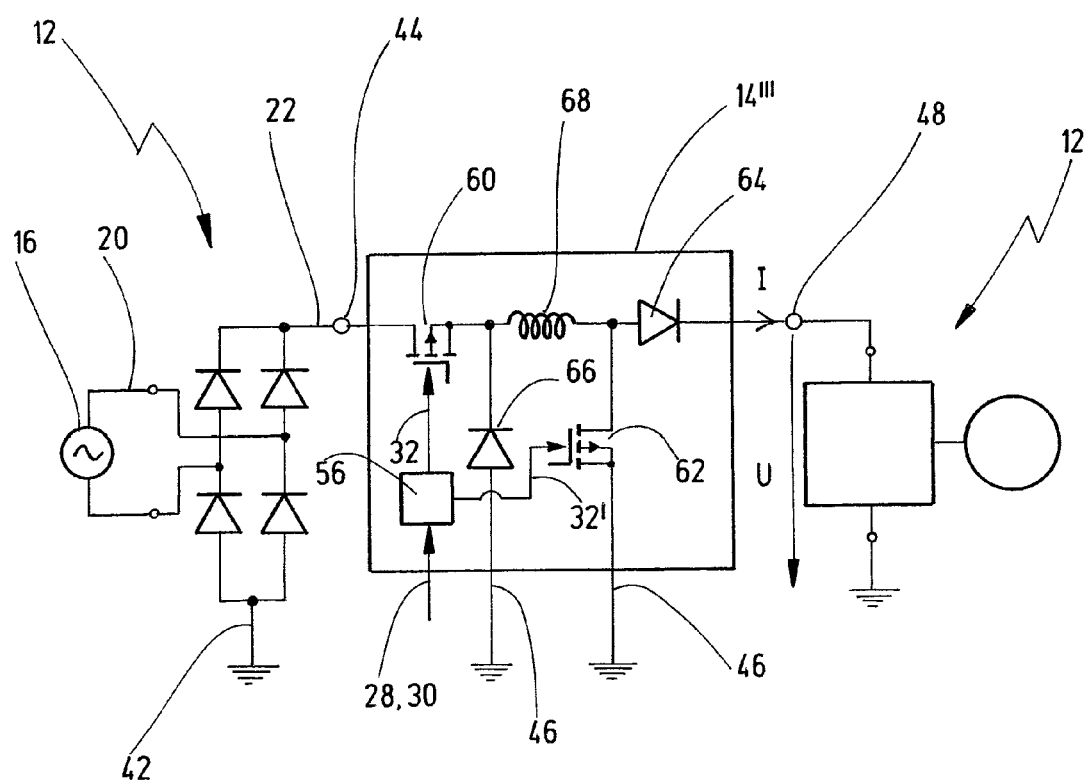
FIG. 5 A driver circuit having a step-up/step-down converter as a control element.

FIG. 5 schematically illustrates another embodiment having a step-up/step-down converter 14''' as a control element 14'''. Identical elements are identified by identical reference numbers, wherein only the special features are explained here.

The control element 14''' has a first controllable switch 60 and a second controllable switch 62. The control element 14''' also has a first diode 64 and a second diode 66. The control element 14''' also has an inductor 68. The first switch 60, the inductor 68 and the first diode 64 are connected in series between the input terminal pole 44 and the output terminal pole 48. The second diode 66 is connected between the first switch 60 and the inductor 68 and forms a connection from the earth pole 46 to the inductor 68. The second controllable switch 62 is connected between the inductor 68 and the first diode 64 and forms a connection to the earth pole 46.

The first controllable switch 60 and the second controllable switch 62 are actuated by the control unit 56 and opened and closed in order to provide the driver current I and the output voltage U at the output terminal pole 48. The first controllable switch 60 is actuated by means of the pulse train signal 32 and the second controllable switch 62 is actuated by means of the pulse train signal 32'. The pulse signal sequences 32, 32' may be shaped identically or inversely to each other or may be adjusted independently of each other.

According to this embodiment, the step-up/step-down converter 14''' is able to provide an output voltage U which is higher or lower than the pulsating DC voltage 22, depending on the actuation of the controllable switches 60, 62.

In a simplest form, the control element 14 can also be configured as a controllable switch, in particular as a MOSFET.

Figure 6A:
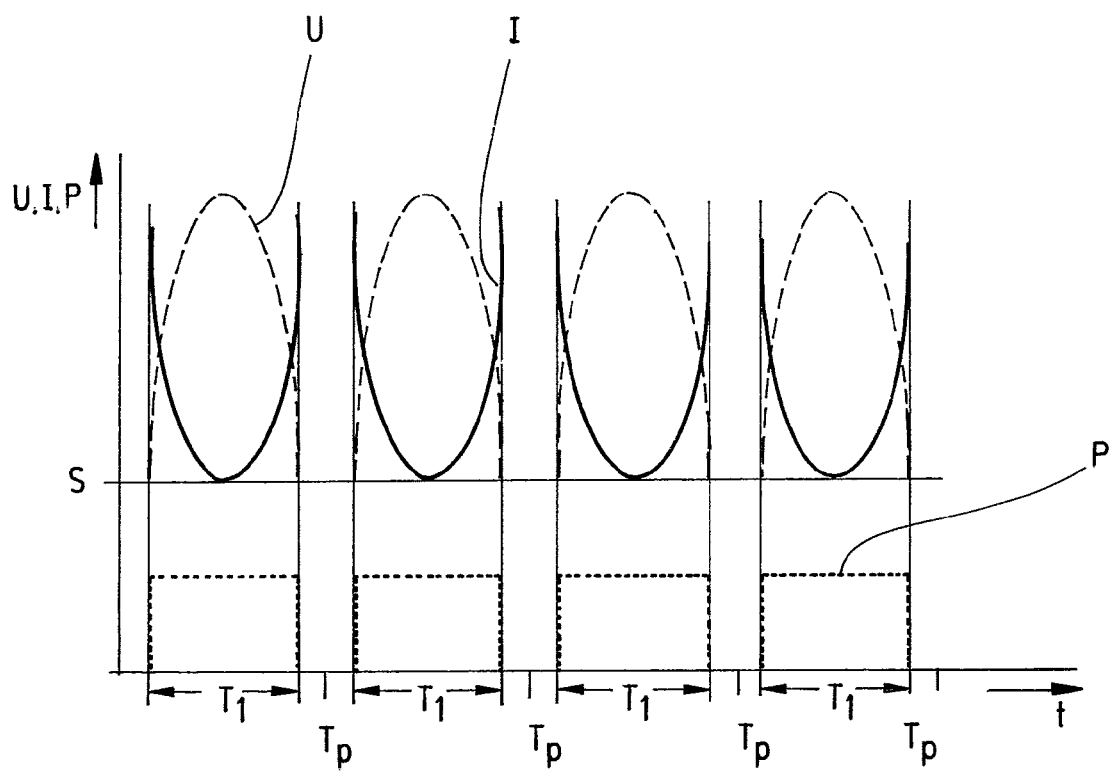
FIG. 6a-c Variously adjustable waveforms of the electrical output value of the driver circuit.
Figure 6B:
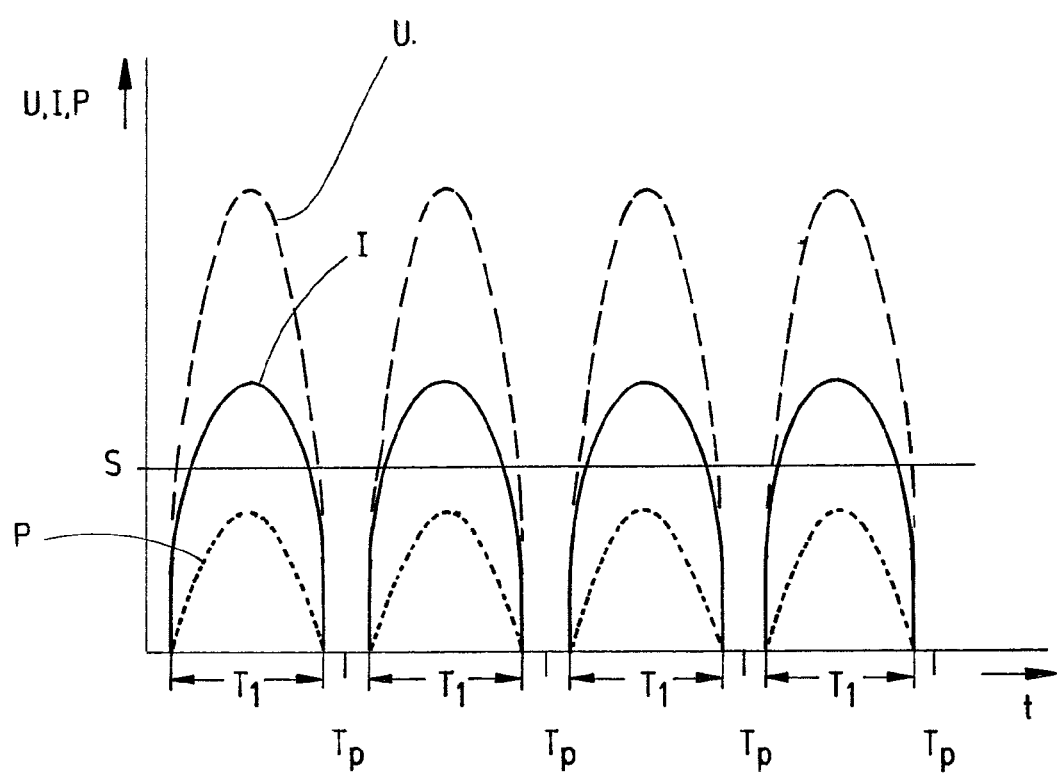
Figure 6C:
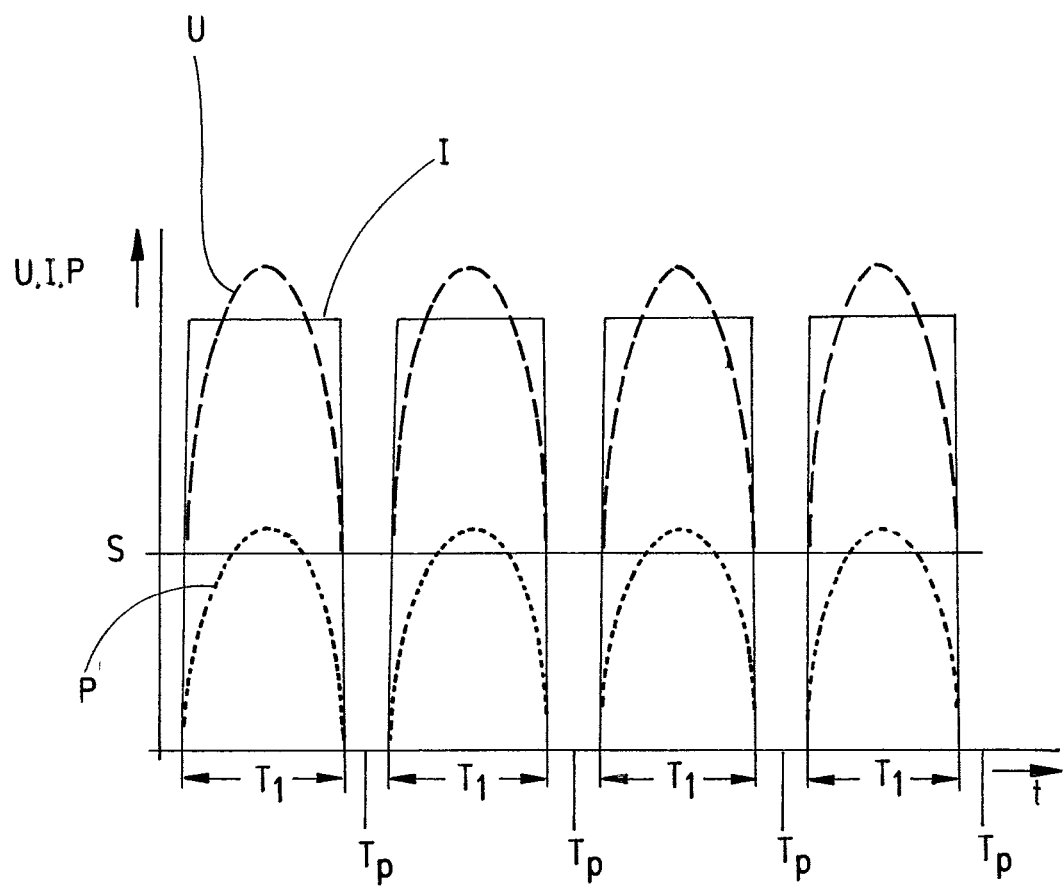

FIGS. 6a to c schematically illustrate waveforms of the electrical output values 24 of the control element 14 over four periods of the pulsating DC voltage 22. The electrical power P is represented by a dotted line, the driver current I by a solid line, and the output voltage U by a dashed line.

FIG. 6a illustrates four periods $T_p$ of the pulsating DC voltage 22. The waveform of the driver current I is adjusted such that the electrical power P is essentially constant. The driver current I is provided only for a specific time period $T_1$ in which the pulsating DC voltage 22 lies above a threshold value S, which is schematically illustrated in FIG. 6a as a horizontal line.

In order to adjust the electrical power P for the period $T_1$ to a constant level, the driver current I and the output voltage U are measured by the measuring device 26 at the output of the control element 14, and the driver current I is adjusted via the control signal 28 and the pulse train signal 32 to have a waveform such that the electrical power P is constant over the time range $T_1$. The controllable switch 50', 60, 62 is not switched between the periods $T_1$, so that no electrical power P is provided. If the electrical load 18 is configured as an electrical machine 18, it is possible to compensate for this power dip via the rotating mass of the rotor or a flywheel mass connected to the rotor. The rotating mass stores rotational energy, making it possible to compensate for brief power dips. Because the high pulse frequency f of the pulse train signal 32 and the regular measurement of the driver current I and of the output voltage U make it possible to make changes very rapidly and accordingly to make adjustments and impressions, it is possible to adjust the constant power P via the control element 14.

As a result, it is thus possible to adjust the electrical power P which is provided to the electrical load 18, so that it is also possible to adjust or regulate the power delivered by the electrical load 18 accordingly.

FIG. 6b illustrates an alternative waveform of the electrical output values 24 for four periods $T_p$ of the pulsating DC voltage 22. The driver current I is adjusted such that the driver current I and the output voltage U have a fixed phase relationship to each other. In this example, they are in phase, but it is also possible to configure a fixed phase shift. Here, the driver current I and the output voltage U at the output of the control element 14 are measured on a regular basis, and the driver current I is accordingly adjusted via the control signal 28 and the pulse train signal 32 so that the output voltage U and the driver current I are in phase.

In this way, it is generally possible to minimize the exchange of reactive power between the control element 14 and the electrical load 18. Furthermore, this makes it possible to maximize the delivered electrical power.

FIG. 6c schematically illustrates another example of the waveform of the electrical output values 24. Here, the driver current I is set as a constant current over the time range $T_1$. In this embodiment, only the driver current I must be measured via the measuring device 26 and accordingly regulated via the control signal 28 and the pulse train signal 32, so that the driver current I is set or impressed at a constant level.

The waveforms in FIGS. 6a to c can also accordingly be requested by the electrical load 18 by means of the control signal 30, so that the electrical input values 24 are accordingly provided to the electrical load 18.

Figure 7:
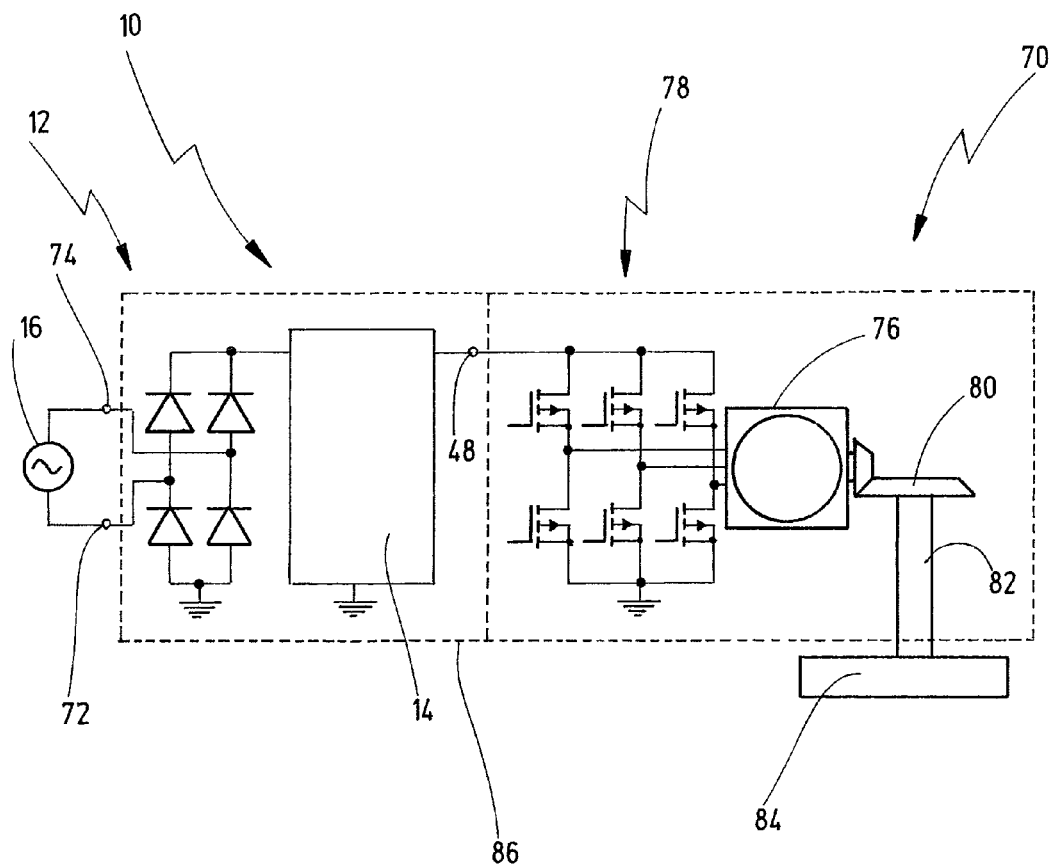
FIG. 7 An application example of the driver circuit for driving an electrically commutated electrical motor for use in a power tool.

FIG. 7 illustrates an application example of the driver circuit 10 for a power tool, which is generally identified by 70.

The power tool 70 has electrical connectors 72, 74 in order to connect the power tool 70 to the AC voltage source 16. The power tool 70 has the driver circuit 10 and an electrical machine 76, which is driven by means of an inverter 78. The electrical machine 76 drives a shaft 82, which is connected to a grinding wheel 84 in a rotationally fixed manner, via a gear 80. The driver circuit 10, the inverter 78, the electrical machine 76, the gear 80 and the shaft 82 are accommodated in a housing 86 of the power tool 70. The driver circuit 10 provides the driver current I and the output voltage U at the output terminal pole 48, which is provided to the inverter 78. The inverter 78 is configured as a three-phase inverter 78 having six controllable switches and converts the provided electrical input value I, U into a three-phase alternating current in order to drive the electrical machine 76 accordingly. In this example, the electrical machine 76 is configured as an electrically commutated machine 76. The electrical machine 76 accordingly drives the grinding wheel 84 via the gear 80 and the shaft 82.

It is to be understood that the driver circuit 10 can also be used to drive other types of machines such as direct-current machines.

Alternatively, the driver circuit 10 can also be used as a current source inverter or a voltage source inverter. In the case of a current source inverter, an additional inductor is connected parallel to the inductor 52, 68 in order to smooth the driver current I accordingly. In the case of the voltage source inverter, a capacitor having a high capacitance is connected on the output side parallel to the control element 14 in order to smooth the output voltage I, U accordingly. In other words, the capacitor is connected between the output terminal pole 48 and the earth pole.

The invention claimed is:

1. Driver circuit for driving an electrical load, in particular an electrical machine, comprising:
    an input terminal pole pair adapted to connect the driver circuit to an AC voltage source, and an output terminal pole pair adapted to connect the driver circuit to the load,
    a rectifier circuit which is connected to the input terminal pole pair and which is adapted to convert an AC voltage from the AC voltage source into a pulsating DC voltage,
    a control element which is connected to the rectifier circuit on the input side and to the output terminal pole on the output side, wherein the control element has a controllable switch and a controller that controls the controllable switch, wherein the controller is configured to switch the controllable switch on and off accordingly by means of a pulse train signal, and wherein an electrical output value of the driver circuit is adjustable by switching the controllable switch, and wherein the controller is connected to a measuring device which is connected to the output terminal pole pair and measures an output voltage and/or the driver current,
    wherein the controller is configured to vary at least one time-based value of the pulse train signal within one period of the pulsating DC voltage on the basis of the measured output voltage and/or the measured driver current such that a waveform of a driver current at the output terminal pole pair is controlled within the period of the pulsating DC voltage.

2. Driver circuit according to claim 1, wherein the control element has a measuring apparatus on the input side that measures the pulsating DC voltage and that provides the driver current by means of the pulse train signal if the pulsating DC voltage exceeds a predefined threshold value.

3. Driver circuit for driving an electrical load, in particular an electrical machine, comprising:
    an input terminal pole pair adapted to connect the driver circuit to an AC voltage source,
    an output terminal pole adapted to connect the driver circuit to the load,
    a rectifier circuit which is connected to the input terminal pole pair and which is adapted to convert an AC voltage from the AC voltage source into a pulsating DC voltage,
    a control element which is connected to the rectifier circuit on the input side and to the output terminal pole on the output side, wherein the control element has a controllable switch and a controller that controlles the controllable switch, wherein the controller is configured to switch the controllable switch on and off accordingly by means of a pulse train signal, and wherein an electrical output value of the driver circuit is adjustable by switching the controllable switch,
    wherein the controller is configured to vary at least one time-based value of the pulse train signal within one period of the pulsating DC voltage such that a waveform of a driver current of the pulsating DC voltage at the output terminal pole is controlled within the period.

4. Driver circuit according to claim 3, wherein the time-based value of the pulse train signal is a pulse frequency within the period.

5. Driver circuit according to claim 3, wherein the time-based value of the pulse train signal is a duty cycle of the pulse train signal.

6. Driver circuit according to claim 3, wherein the controller is connected to a measuring arrangement which is connected to the output terminal pole and measures an output voltage and/or the driver current, in order to adjust the time-based value based on the measured output voltage and/or the measured driver current.

7. Driver circuit according to claim 3, wherein a control unit of the load is connected to the controller via a control line in order to adjust the time-based value.

8. Driver circuit according to claim 3, wherein the control element has a measuring apparatus on the input side that measures the pulsating DC voltage and that provides the driver current by means of the pulse train signal if the pulsating DC voltage exceeds a predefined threshold value.

9. Driver circuit according to claim 3, wherein the time-based value can be adjusted such that electrical power provided at the output pole is constant.

10. Driver circuit according to claims 3, wherein the time-based value can be adjusted such that the provided driver current is constant.

11. Driver circuit according to claim 3, wherein the time-based value can be adjusted such that the driver current is in phase with the output voltage.

12. Driver circuit according to claim 6, wherein the measuring arrangement is configured to measure the electrical value at predefined points in time within the period and to provide a corresponding control signal to the control unit.

13. Driver circuit according to claim 12, wherein the controller is configured to control the controllable switch depending on the control signal at the predefined points in time by means of the pulse train signal.

14. Driver circuit according to claim 3, wherein the control element is configured as a step-up converter, a step-down converter or a step-up/step-down converter.

15. Driver circuit according to claim 3, wherein the control element has a capacitor on the output side having a capacitance which is lower than 100 nF.

16. Method for driving an electrical load, in particular an electrical machine, having the steps of:
    Connecting a rectifier circuit to an AC voltage source,
    Converting an AC voltage from the AC voltage source into a pulsating DC voltage,
    Converting the pulsating DC voltage by means of a control element into an output current and/or an output voltage as an electrical output value that drives the electrical load, wherein the control element has a controllable switch which is switched on and off accordingly by means of a pulse train signal in order to adjust the electrical output value depending on at least one time-based value of the pulse train signal,
    Measuring the output value at output terminals,
wherein the time-based value of the pulse train signal is varied within one period of the pulsating DC voltage in order to control a waveform of a driver current as the electrical output value within the period of the pulsating DC voltage.

17. Power tool having an electrical machine and having a driver circuit according to claim 3 for driving the electrical machine.

18. Electrical drive unit having an electrical machine which has a stator and a rotor, and having a driver circuit according to claim 3 for driving the electrical machine, wherein the rotor has a flywheel mass in order to store rotational energy of the rotor.

* * * * *